Aug. 31, 1926.
J. T. BREEN
SPRING WHEEL
Filed May 25, 1925  2 Sheets-Sheet 1
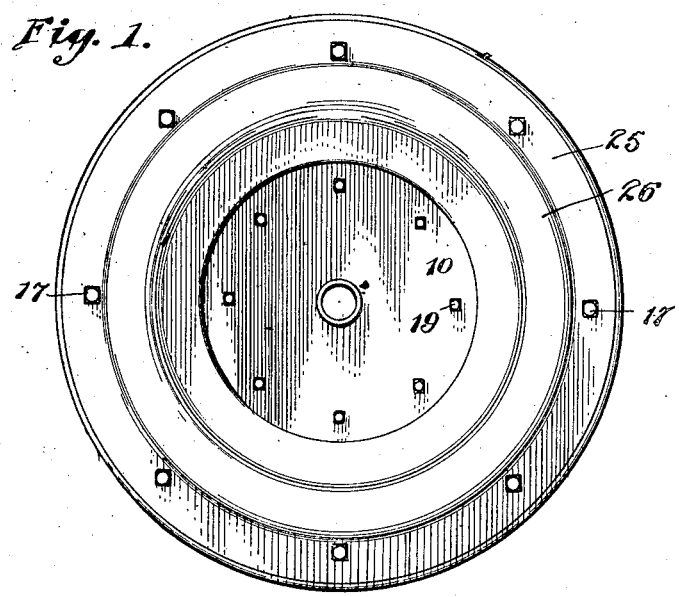
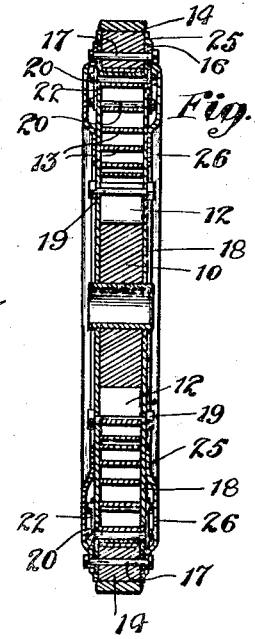
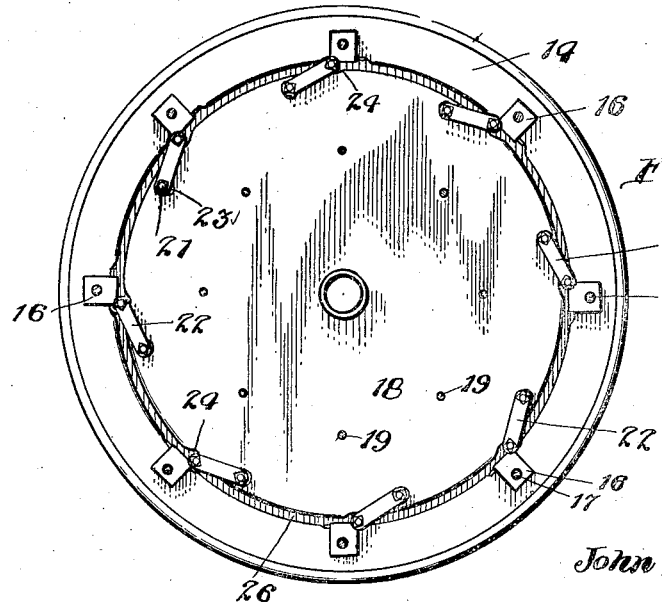
John T. Breen,
Inventor
By William L. Symons
his Attorney Aug. 31, 1926.
J. T. BREEN
1,598,237
SPRING WHEEL
Filed May 25, 1925   2 Sheets-Sheet 2
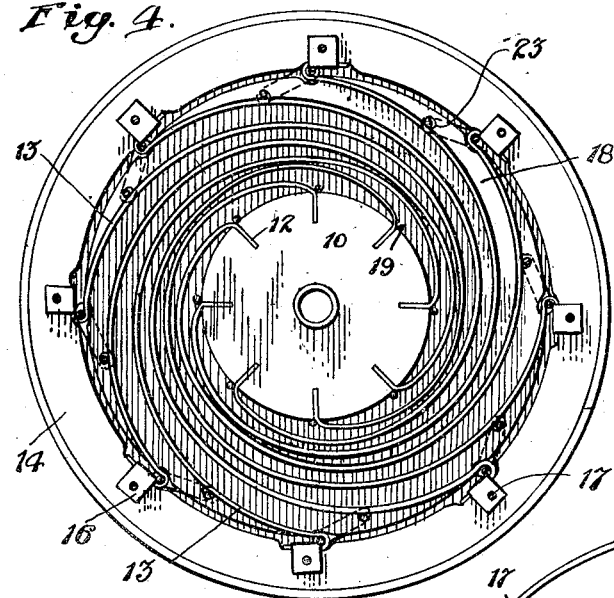
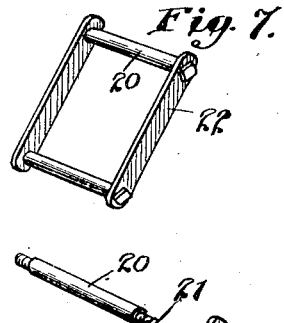
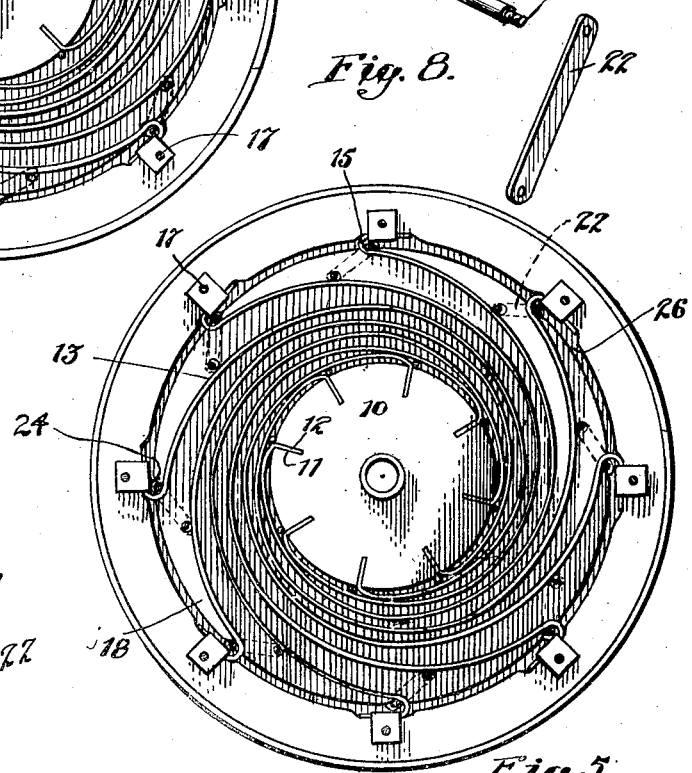
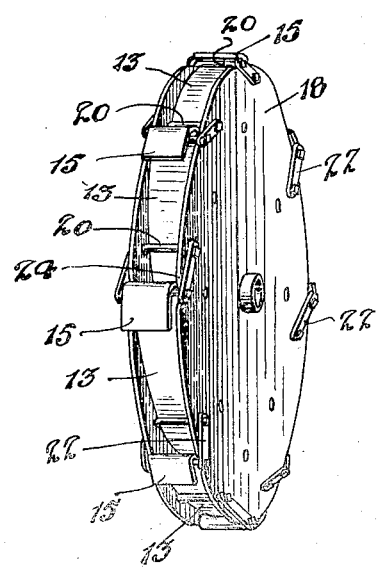
John T. Breen,
Inventor Patented Aug. 31, 1926.

1,598,237

UNITED STATES PATENT OFFICE.

JOHN T. BREEN, OF HURON, SOUTH DAKOTA.

SPRING WHEEL.

Application filed May 25, 1925. Serial No. 32,687.

My invention relates to improvements in wheels and more especially to spring wheels for use in connection with motor vehicles and the like.

An important object of my invention is to provide means for interlocking the springs of the wheel to a large resistance and thereby insure centralization of the hub at all times and greater spring efficiency.

Another object of my invention is to provide a device of the above mentioned character which will relieve the gears of a motor vehicle or the like from any strain or breakage due to sudden starting.

A further object of my invention is the provision of a device of this character which will be of simple construction, inexpensive to manufacture, strong and durable.

Other objects and advantages of my invention will be apparent during the course of the following description.

In the accompanying drawings which form a part of this specification and wherein like characters of reference denote like or corresponding parts throughout the same.

Figure 1 is a side elevation of a complete wheel embodying my invention,

Figure 2 is a central vertical sectional view therethrough,

Figure 3 is a side elevation of the wheel with the cover plate removed.

Figure 4 is a similar view with the cover and interlocking plates removed,

Figure 5 is a similar view illustrating the position of the parts when the hub is turned with respect to the wheel rim.

Figure 6 is a perspective view of the wheel with the cover plates and rim removed.

Figure 7 is a detail view of one of the interlocking links, and

Figure 8 is a similar view showing the various elements of the link taken apart.

In the drawings wherein for the purpose of illustration is shown a preferred embodiment of my invention, the numeral 10 designates the wheel hub which is adapted to receive the axle (not shown). The hub is provided with radial slots 11 for the reception of the inner ends 12 of the leaf spring members 13. The spring members 13 are connected to the wheel rim 14 at a point approximately 270 degrees from the point of connection to the hub, and have their ends turned upon themselves to form loops 15, the ends of which fit under substantially U-shaped clamping members 16 which are secured to the rim by means of bolts 17. The inner periphery of the rim 14 is preferably notched to receive the ends of the springs and the clamping members.

A pair of plates 18 of a diameter slightly less than the inner periphery of the rim are bolted to the hub by means of bolts 19, so as to move therewith. These bolts 19 bear against the inner ends of the springs and serve to retain them in place within the slots in the hub.

My interlocking link comprises a pair of sleeves 20 through which extend screw threaded rods 21 which pass through plates 22 and are secured thereto by suitable nuts, the sleeves serving to space the plates. One of the sleeves 20 fits within the loop 15 of one of the springs and the other passes through openings 23 in the interlocking plates 18. It will be seen that the outer end of the link is arranged beyond the plates 18, and the sleeves 20 thereof normally rests in the cutaway portions 24 of the plates 18. There is one of these interlocking links to engage the loops of each of the springs and work in the space between the inner periphery of the rim and the outer peripheries of the plates 18.

The springs are wound up to their proper resistance and then interlocked by means of the links which interlock both ends of springs due to their connection with the plates 18. The winding operation may be accomplished by inserting the springs in the slots 11 and winding them about the hub until their outer ends have reached a point approximately 270 degrees from their inner ends, or by inserting all of the springs in the hub and turning the hub the required distance before interlocking the springs with the links. This construction insures that the hub will always be centralized, and that the proper resiliency will be present in the wheel. When the axle first turns, the hub will turn and wind up on the springs which in turn will rotate the rim. This prevents damage to gears by sudden starting. Reversal of the wheel is also taken care of by the links which will interlock the springs and prevent a sudden jerk when axle is first turned. Cover plates 25 are secured to the rim by means of the clamp retaining bolts 17 and are provided with annular raised portions 26 to accommodate the links and allow their free movement. These plates fall short of the bolts 19 so as to allow free movement of the hub and interlocking plate which is rigidly secured to the hub, by the bolts 19 or other suitable means. The cover plates are also preferably spaced from the interlocking plates for the same purpose.

Although my invention has been described as applied to a vehicle wheel, it is not restricted to this use but may be used wherever springs are needed.

While I have shown and described the preferred embodiment of my invention, it is to be understood that various changes in the size, shape, and arrangement of parts may be resorted to without departing from the spirit of my invention or the scope of the subjoined claims.

Having described my invention what I claim as new and desire to protect by Letters Patent is:

1. A wheel comprising a rim, a hub, leaf springs secured to said hub, the outer ends of said springs being bent upon themselves to form loops, means for securing said loops to the rim at a point remote from the point of connection with the hub, plates secured to the hub, and links carried by said plates and adapted to be actuated thereby to interlock the springs to thereby interlock their resistance.

2. A wheel comprising a rim, a hub, leaf springs connecting said hub to the rim, plates secured to the hub, and links comprising spaced members secured to said plates for interlocking the springs to thereby interlock their resistance.

3. A wheel comprising a rim, a hub, springs connecting said rim and hub, and links comprising spaced members adapted to engage said springs to increase their resistance.

4. A wheel comprising a rim, a hub, springs connecting said hub and rim, plates secured to the hub, interlocking links secured to said plates to be actuated thereby, said links comprising spaced members arranged on either side of the springs and adapted to engage said springs to increase their resistance when the hub is turned with respect to the rim.

5. A wheel comprising a rim, a hub, leaf springs connecting said hub and rim, plates secured to the hub, interlocking links attached to the plates, said links comprising spaced members arranged on either side of the springs and adapted to engage the same and a cover plate secured to the rim, and provided with an annular raised portion to allow free movement of the links.

6. A wheel comprising a rim, a hub, leaf springs secured to said hub, said springs having their outer ends bent upon themselves to form loops, means to secure said loops to the rim at a point remote from their point of connection with the hub, plates secured to said hub, interlocking links carried by the plates and comprising spaced members engaging the loops of the springs, and a cover plate secured to said rim and spaced from said hub plate, said cover plate being provided with an annular raised portion to allow free movement of the links.

7. A spring device comprising a central hub, springs secured thereto, means connecting the ends of said springs, and means whereby said springs may be interlocked to increase their resistance.

8. A spring device comprising a central hub, springs secured thereto, means connecting the ends of said springs, and links comprising spaced members arranged to cooperate with said springs to interlock the resistance of the springs and centralize the hub.

In testimony whereof I affix my signature.

JOHN T. BREEN.